(12) United States Patent
Lin et al.

(10) Patent No.: US 12,403,678 B2
(45) Date of Patent: *Sep. 2, 2025

(54) ANTI-SLIP PAD WITH HIGH COEFFICIENT OF STATIC FRICTION

(71) Applicant: Hertide Material Co., Taichung (TW)

(72) Inventors: Ming-Hui Lin, Taichung (TW); Sung-Yen Kung, Taichung (TW)

(73) Assignee: HERTIDE MATERIAL CO., Taichung (TW)

( * ) Notice: Subject to any disclaimer, the term of this patent is extended or adjusted under 35 U.S.C. 154(b) by 237 days.

This patent is subject to a terminal disclaimer.

(21) Appl. No.: 18/097,299

(22) Filed: Jan. 16, 2023

(65) Prior Publication Data

US 2024/0123711 A1   Apr. 18, 2024

(30) Foreign Application Priority Data

Sep. 30, 2022   (TW) ................... 111137333

(51) Int. Cl.
  *B32B 27/06*   (2006.01)
  *B32B 5/18*   (2006.01)
  (Continued)

(52) U.S. Cl.
  CPC .............. *B32B 27/065* (2013.01); *B32B 5/18* (2013.01); *B32B 27/36* (2013.01); *B32B 27/40* (2013.01);
  (Continued)

(58) Field of Classification Search
  CPC .... B32B 2266/0264; B32B 2266/0278; B32B 2270/00; B32B 2274/00; B32B 2305/022;
  (Continued)

(56) References Cited

U.S. PATENT DOCUMENTS

| 11,759,984 B1 * | 9/2023 | Lin ..................... B29C 44/42 428/304.4 |
| 2015/0038606 A1 | 2/2015 | Baghdadi |

(Continued)

FOREIGN PATENT DOCUMENTS

| JP | 2001261874 A | 9/2001 |
| JP | 2002201301 A | 7/2002 |

(Continued)

OTHER PUBLICATIONS

Translation of WO 2022137875-A1, Daichi et al., Jun. 30, 2022. (Year: 2022).*

(Continued)

*Primary Examiner* — Hai Vo
(74) *Attorney, Agent, or Firm* — WPAT, PC

(57) ABSTRACT

Provided is an anti-slip pad with high coefficient of static friction, comprising a surface layer and a foamed inner layer, and having a coefficient of static friction of 0.58 to 1.4, which is determined by standard method ASTM D1894; and the anti-slip pad with high coefficient of static friction is prepared by injecting and molding a supercritical fluid blend obtained from a polymer material and a supercritical fluid; wherein the polymer material comprises a thermoplastic ether ester elastomer, a thermoplastic polyurethane or a combination thereof; the polymer material has elongation at break of 300% or more; the thermoplastic ether ester elastomer has a melt flow index at 230° C. of 20 g/10 min or less and Shore D hardness of 30D to 45D; and the thermoplastic polyurethane has a melt flow index at 205° C. of 25 g/10 min or less and Shore A hardness of 60A to 95A.

4 Claims, 5 Drawing Sheets

(51) Int. Cl.
　　　*B32B 27/36*　　(2006.01)
　　　*B32B 27/40*　　(2006.01)
(52) U.S. Cl.
　　　CPC .......... *B32B 2266/0264* (2013.01); *B32B 2266/0278* (2013.01); *B32B 2274/00* (2013.01); *B32B 2305/022* (2013.01); *B32B 2307/72* (2013.01); *B32B 2307/724* (2013.01); *B32B 2307/732* (2013.01); *B32B 2307/744* (2013.01)
(58) Field of Classification Search
　　　CPC .......... B32B 2307/536; B32B 2307/72; B32B 2307/724; B32B 2307/732; B32B 2307/7376; B32B 2307/744; B32B 2471/00; B32B 27/065; B32B 27/36; B32B 27/40; B32B 5/18
　　　See application file for complete search history.

(56) References Cited

U.S. PATENT DOCUMENTS

| | | | |
|---|---|---|---|
| 2021/0076772 A1 | 3/2021 | Baghdadi et al. | |
| 2021/0079188 A1* | 3/2021 | Baghdadi | A43B 13/26 |
| 2021/0179765 A1* | 6/2021 | Farkas | C08L 75/06 |

FOREIGN PATENT DOCUMENTS

| | | | |
|---|---|---|---|
| JP | 2009544828 A | | 12/2009 |
| JP | 2011184632 A | | 9/2011 |
| JP | 2013100039 A | * | 5/2013 |
| JP | 7253291 B1 | | 4/2023 |
| TW | 2016 05629 A | | 2/2016 |
| TW | I729300 B | | 6/2021 |
| WO | WO-2022137875 A1 | * | 6/2022 |

OTHER PUBLICATIONS

Translation of JP 18097299, Kohei Yamada, May 23, 2013. (Year: 2013).*
Error margins in numerical values (Apr. 2025 edition), printed by webpage <URL: https://www.epo.org/en/legal/guidelines-epc/2024/g_vi_7_1.html> on Jul. 10, 2025, published by Guidelines for Examination of EPC.
Experimental Error, printed from the webpage <URL:https://courses.cit.cornell.edu/virtual_lab/LabZero/Experimental_Error.shtml#:~:text=Engineers%20also%20need%20to%20be,analysis%20techniques%20to%20get%20any> published on Jun. 17, 2014, retrieved from Internet Archive <https://web.archive.org/web/20190301000000*/https://courses.cit.cornell.edu/virtual_lab/LabZero/Experimental_Error.shtml> on Jul. 10, 2025.

* cited by examiner

ANTI-SLIP PAD WITH HIGH COEFFICIENT OF STATIC FRICTION

CROSS-REFERENCE TO RELATED APPLICATION

Pursuant to 35 U.S.C. § 119(a), this application claims the benefit of the priority to Taiwan Patent Application No. 111137333, filed on Sep. 30, 2022. The content of the prior application is incorporated herein by its entirety.

BACKGROUND OF THE INVENTION

1. Field of the Invention

The present invention relates to a recyclable light-weighted anti-slip pad with high coefficient of static friction, especially an anti-slip pad with high coefficient of static friction prepared by injection molding with a supercritical fluid.

2. Description of the Prior Arts

Nowadays, most anti-slip pads are made of thermosetting rubbers. Rubber is a heavy and hard material, so additional processing will be needed. In addition, rubber is unrecyclable, and waste rubber has caused irreversible damage to the environment for a long time.

To follow the global trend of waste reduction and to respond to the demand in waste recycling for environmental protection, recyclable thermoplastic elastomers (TPEs) with good mechanical properties such as thermoplastic polyurethane (TPU) has been used to replace the unrecyclable thermosetting rubbers to produce anti-slip pads. However, the anti-slip effect of the anti-slip pads produced by thermoplastic polyurethane is unsatisfactory, and still needs to be improved.

Since the current anti-slip pads made of rubber are heavy and disadvantageous for recycling, and the anti-slip pads made of thermoplastic polyurethane has unsatisfactory anti-slip effect, it is still needed to develop a polymer material which can be processed to prepare recyclable light-weighted products having high coefficient of static friction. In addition, the related preparation process also needs to be improved in order to produce anti-slip pads by using recyclable materials with good properties and to promote the functions and properties of the anti-slip pads.

SUMMARY OF THE INVENTION

To overcome the shortcomings, one objective of the present invention is to provide a recyclable light-weighted anti-slip pad having high coefficient of static friction.

To achieve the above objectives, the present invention provides an anti-slip pad with high coefficient of static friction, which comprises a surface layer and a foamed inner layer, and the foamed inner layer is covered by the surface layer; the anti-slip pad with high coefficient of static friction has a coefficient of static friction of 0.58 to 1.4, which is determined according to standard method ASTM D1894; and the anti-slip pad with high coefficient of static friction is prepared by a method comprising the following steps: (1) providing a polymer material comprising a thermoplastic ether ester elastomer, a thermoplastic polyurethane or a combination thereof; wherein the polymer material has elongation at break of 300% or more, the thermoplastic ether ester elastomer has a melt flow index at 230° C. of 20 grams per 10 minutes (g/10 min) or less and Shore D hardness of 30D to 45D, and the thermoplastic polyurethane has a melt flow index at 205° C. of 25 g/10 min or less and Shore A hardness of 60A to 95A; (2) melting the polymer material to obtain a molten polymer material; (3) adding a supercritical fluid into the molten polymer material to obtain a mixture, and compounding the mixture to obtain a supercritical fluid blend; and (4) injecting and molding the supercritical fluid blend to obtain the anti-slip pad with high coefficient of static friction.

The present invention chooses or recycles and reuses a thermoplastic ether ester elastomer and/or a thermoplastic polyurethane having the melt flow index, Shore hardness and elongation at break in specific ranges as the polymer material, and combines the polymer material and injection molding technique with a supercritical fluid, to successfully obtain an anti-slip pad having a structure comprising an unfoamed surface layer and a foamed inner layer with a specific proportion of open pores, and the resulting anti-slip pad is recyclable, light-weighted, and has high coefficient of static friction. The thermoplastic ether ester elastomer and thermoplastic polyurethane are recyclable materials, and the unfoamed surface layer is highly air-permeable and equivalent to an air-permeable film, such that the air outside of the anti-slip pad with high coefficient of static friction may pass through the unfoamed surface layer and into the foamed inner layer, and the air inside the foamed inner layer may pass through the unfoamed surface layer and exit to the outside of the anti-slip pad with high coefficient of static friction. Therefore, when a load is carried on the anti-slip pad with high coefficient of static friction, the microcellular foamed structure of open pores in the foamed inner layer is compressed and a micro-distortion occurs in this structure, and the air in the open pores of the foamed inner layer is squeezed and get out of the anti-slip pad with high coefficient of static friction, which results in a suction-like effect between the surface of the anti-slip pad with high coefficient of static friction and the ground below. Both the above-mentioned micro-distortion and suction-like effect help to increase the coefficient of static friction of the anti-slip pad. Through the foamed inner layer with a specific proportion of open pores, the anti-slip pad with high coefficient of static friction of the present invention also achieves its light-weight goal. In addition, injection molding technique with a supercritical fluid is used to foam the anti-slip pad and no high-volatile chemical foaming agent such as pentane is needed. Therefore, no toxic substance will be produced, and no fire safety or pollution concerns will be caused, and the products can be applied even more broadly.

It should be understood that the desired air-permeable polymer material may be obtained by choosing materials with melt flow index at a specific temperature, and Shore hardness and elongation at break or prepared by compounding, thereby obtaining the anti-slip pad with high coefficient of static friction of the present invention.

In some embodiments, the surface layer is substantially free of pores. In some embodiments, the surface layer is substantially free of pores under a microscope. In some embodiments, the surface layer is free of pores. In some embodiments, the surface layer is free of pores under a microscope.

In some embodiments, the surface layer is an air-permeable surface layer having a thickness of 50 μm to 600 μm. In some embodiments, the surface layer may have a thickness of 60 μm to 550 μm, 70 μm to 500 μm, 80 μm to 450 μm, 90 μm to 400 μm, 100 μm to 350 μm, 150 μm to 300 μm, or 200 μm to 250 μm. In some embodiments, the surface layer has a thickness of 50 μm to 100 μm.

In some embodiments, when the structure of the air-permeable surface layer is worn and torn, and the foamed inner layer is exposed, at this moment, the micro-distortion and suction-like effect still occur when a load is carried by the anti-slip pad with high coefficient of static friction, so the coefficient of static friction of the anti-slip pad with high coefficient of static friction can be maintained.

In some embodiments, the foamed inner layer comprises multiple pores, the pores comprise multiple closed pores and multiple open pores, and the open pores may be in a proportion of 10% to 75%. In some embodiments, the open pores may be in a proportion of 15% to 65%, 20% to 60%, 25% to 55%, 30% to 50%, 35% to 45%, or 35% to 40%.

In some embodiments, the pores comprised in the foamed inner layer (i.e., closed pores and open pores) have a long diameter of 50 μm to 400 μm, or 100 μm to 350 μm, or 150 μm to 300 μm, or 200 μm to 250 μm. In the present invention, the pores are irregularly-shaped, and the long diameter of the pores indicates the longest inner diameter of the pores. In the present invention, the pores comprised in the foamed inner layer of the anti-slip pad with high coefficient of static friction are filled with air, wherein the term "closed pores" indicates pores formed from single nucleation point; and the term "open pores" indicates pores formed by two or more closed pores with one or more through holes formed between the closed pores.

In some embodiments, the thermoplastic ether ester elastomer comprises monomers represented by the following Formula (I) and Formula (II):

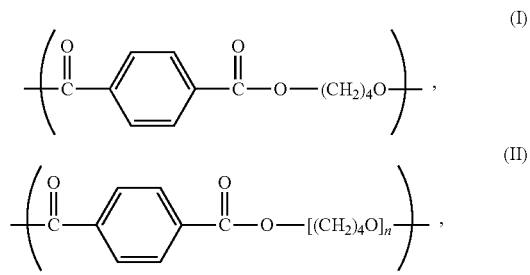

wherein monomer represented by Formula (I) has an amount of 10 percent by weight (wt %) to 45 wt %; monomer represented by Formula (II) has an amount of 55 wt % to 90 wt %; and n is an integer between 3 and 35.

In some embodiments, n in Formula (II) may be 4, 5, 6, 7, 8, 9, 10, 20 or 30.

In some embodiments, the polymer material may be 100 wt % of the thermoplastic ether ester elastomer. In some embodiments, the polymer material may be 100 wt % of the thermoplastic polyurethane. In some embodiments, the polymer material comprises a combination of a thermoplastic ether ester elastomer and a thermoplastic polyurethane, wherein the thermoplastic polyurethane may be used as a foaming enhancer in the combination.

In some embodiments, the polymer material comprises a combination of a thermoplastic ether ester elastomer and a thermoplastic polyurethane, and the thermoplastic ether ester elastomer is in an amount of 10% by weight or more to 90% by weight or less, and the thermoplastic polyurethane is in an amount of 10% by weight or more to 90% by weight or less, based on the total weight of the polymer material. In some embodiments, the polymer material comprises a combination of a thermoplastic ether ester elastomer and a thermoplastic polyurethane, and the thermoplastic ether ester elastomer is in an amount of 20% by weight or more to 80% by weight or less, and the thermoplastic polyurethane is in an amount of 20% by weight or more to 80% by weight or less, based on the total weight of the polymer material. In some embodiments, the polymer material comprises a combination of a thermoplastic ether ester elastomer and a thermoplastic polyurethane, and the thermoplastic ether ester elastomer is in an amount of 30% by weight or more to 70% by weight or less, and the thermoplastic polyurethane is in an amount of 30% by weight or more to 70% by weight or less, based on the total weight of the polymer material. In some embodiments, the polymer material comprises a combination of a thermoplastic ether ester elastomer and a thermoplastic polyurethane, and the thermoplastic ether ester elastomer is in an amount of 40% by weight or more to 60% by weight or less, and the thermoplastic polyurethane is in an amount of 40% by weight or more to 60% by weight or less, based on the total weight of the polymer material. In some embodiments, the polymer material comprises a combination of a thermoplastic ether ester elastomer and a thermoplastic polyurethane, and the thermoplastic ether ester elastomer is in an amount of 50% by weight, and the thermoplastic polyurethane is in an amount of 50% by weight, based on the total weight of the polymer material.

In some embodiments, the polymer material further comprises one or more additives, and the additives may be a tackifier, a processing aid such as silica or talc, an antioxidant, an ultraviolet absorber, a hindered amine compound, a lubricant, a filler, a flame retardant, a flame retardant additive, a release agent, an antistatic agent, a molecular modifier such as a peroxide, a metal deactivator, an organic or inorganic nucleating agent, a neutralizing agent, an antacid, an antiseptic, a fluorescent brightener, an organic or inorganic pigment, an organic or inorganic compound to offer flame retardance or thermal stability, and the like.

In some embodiments, the polymer material has elongation at break of 300% to 600%, or 400% to 500%.

In some embodiments, the thermoplastic ether ester elastomer has a melt flow index at 230° C. of 5 g/10 min to 20 g/10 min, or 5 g/10 min to 18 g/10 min, or 5 g/10 min to 15.5 g/10 min.

In some embodiments, the thermoplastic ether ester elastomer has Shore hardness D of 30D to 40D.

In some embodiments, the thermoplastic polyurethane has a melt flow index at 205° C. of 5 g/10 min to 25 g/10 min, or 10 g/10 min to 25 g/10 min, or 15 g/10 min to 25 g/10 min.

In some embodiments, the thermoplastic polyurethane has Shore hardness A of 60A to 95A, or 70A to 90A, or 80A to 90A.

In some embodiments, the supercritical fluid added in the step (3) is a nitrogen supercritical fluid. With a critical condition of nitrogen, namely, a temperature higher than the critical temperature of nitrogen, −147° C. (corresponding to 126.2 K), and a pressure higher than the critical pressure of nitrogen, 3.4 MPa (corresponding to 34 bars), a nitrogen supercritical fluid is formed. In some embodiments, the supercritical fluid added in the step (3) is a carbon dioxide supercritical fluid. With a critical condition of carbon dioxide, namely, a temperature higher than the critical temperature of carbon dioxide, 31° C. (corresponding to 304.1 K), and a pressure higher than the critical pressure of carbon dioxide, 7.38 MPa (corresponding to 73.8 bars), a carbon dioxide supercritical fluid is formed. In some embodiments, the step (3) is conducted at a temperature of 190° C. to 230° C. and a pressure of 127 bars.

In some embodiments, the step (4) is conducted in a mold, and the mold has a delayed venting time in mold of 0.0 second (sec.) to 0.8 sec.

In some embodiments, the preparation method further comprises a step (5): cooling the anti-slip pad with high coefficient of static friction in the mold. In some embodiments, the preparation method further comprises a step (5): cooling the anti-slip pad with high coefficient of static friction.

In some embodiments, the anti-slip pad with high coefficient of static friction is prepared by a vertical injection molding machine or a horizontal injection molding machine. In some embodiments, the anti-slip pad with high coefficient of static friction is prepared by a vertical injection molding machine.

In some embodiments, the anti-slip pad with high coefficient of static friction has a coefficient of static friction of 0.58 to 1.4, or 0.70 to 1.35, which is determined according to the standard method ASTM D1894 using a sled weight of standard weight 200 grams (g) during determination. The coefficient of static friction determined according to the standard method ASTM D1894 using a standard sled weight of 200 g during determination is also identified as a "coefficient of static friction at 200 g sled weight" in the present invention. In some embodiments, the anti-slip pad with high coefficient of static friction has another coefficient of static friction of 0.62 to 2.3, or 0.70 to 2.27, which is determined by the ASTM D1894 in which the sled weight is 1000 g during determination. The coefficient of static friction determined according to the ASTM D1894 using a sled weight of 1000 g during determination is also identified as a "coefficient of static friction at 1000 g sled weight" in the present invention.

In some embodiments, the anti-slip pad with high coefficient of static friction has an average density of 0.35 g/cm$^3$ to 0.85 g/cm$^3$, or 0.4 g/cm$^3$ to 0.8 g/cm$^3$, or 0.45 g/cm$^3$ to 0.7 g/cm$^3$, or 0.5 g/cm$^3$ to 0.6 g/cm$^3$.

In some embodiments, the anti-slip pad with high coefficient of static friction has abrasion resistance of 300 mm$^3$ or lower, or 250 mm$^3$ or lower, or 200 mm$^3$ or lower.

In some embodiments, the anti-slip pad with high coefficient of static friction has a coefficient of static friction of 0.58 to 1.4, which is determined according to standard method ASTM D1894; and an average density of 0.35 g/cm$^3$ to 0.85 g/cm$^3$.

DETAILED DESCRIPTION OF THE PREFERRED EMBODIMENTS

Other objectives, advantages and novel features of the invention will become more apparent from the following detailed description when taken in conjunction with the accompanying drawings.

Preparation of Anti-Slip Pads with High Coefficient of Static Friction

Figure 1:
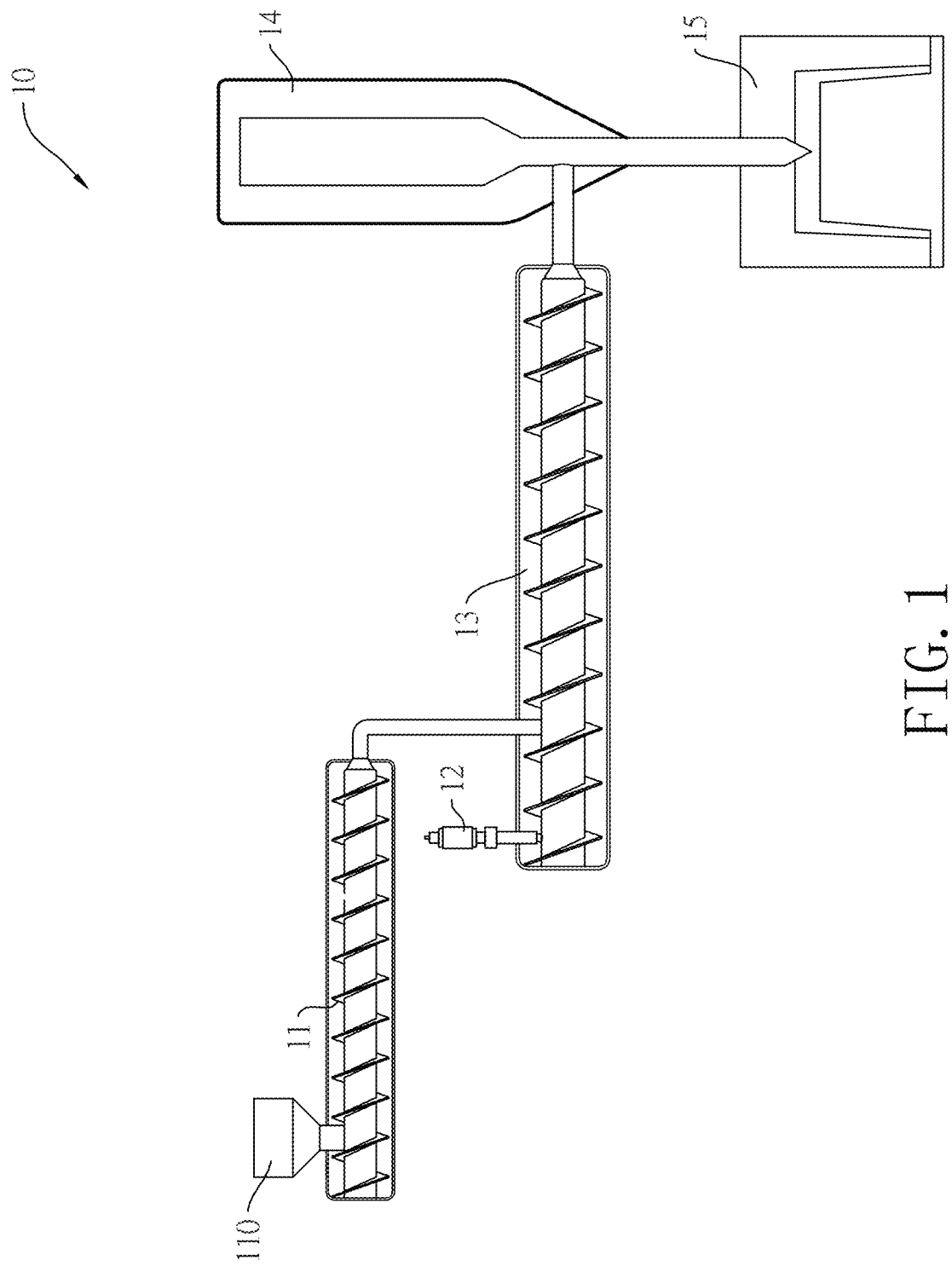
FIG. 1 is a schematic diagram of the vertical injection molding machine used in Examples of the present invention.

The anti-slip pad with high coefficient of static friction of the present invention is prepared by using the vertical injection molding machine 10 shown in FIG. 1, but the general horizontal injection molding machine can also be used for the preparation. The injection molding machine 10 comprises a first screw barrel 11, an introduction part 12, a second screw barrel 13, an injector 14 and a mold 15. The size of the mold 15 is 200 millimeters (mm)×200 mm×20 mm.

First of all, a polymer material comprising a thermoplastic ether ester elastomer, a thermoplastic polyurethane, or a combination thereof was provided. The polymer material having elongation at break of 300% of more, the thermoplastic ether ester elastomer having a melt flow index at 230° C. of 20 g/10 min or less and Shore D hardness of 30D to 45D, and the thermoplastic polyurethane having a melt flow index at 205° C. of 25 g/10 min or less and Shore A hardness of 60A to 95A were chosen for the preparation.

As shown in Table 1, the polymer materials 1 and 2 were thermoplastic ether ester elastomers (TEEE), the polymer materials 3 and 4 were thermoplastic polyurethanes (TPU), and the polymer materials 5 and 6 were combinations of a thermoplastic ether ester elastomer and a thermoplastic polyurethane.

Properties of the polymer materials 1 to 6 were examined as below. The results are listed in the following Table 1.

A1. Melt flow index (MI) at 230° C.: examined according to the standard method ISO 1133.

A2. Melt flow index (MI) at 205° C.: examined according to the standard method DIN-53735.

A3. Shore A hardness (Shore A): examined according to the standard method ISO 868.

A4. Shore D hardness (Shore D): examined according to the standard method ISO 868.

A5. Elongation at break of thermoplastic ether ester elastomer: examined according to the standard method ISO 527.

A6. Elongation at break of thermoplastic polyurethane: examined according to the standard method DIN-53504.

TABLE 1

| | TEEE | | | | TPU | | | |
|---|---|---|---|---|---|---|---|---|
| Polymer material | Content (%) | MI at 230° C. (g/10 min) | Shore D hardness (D) | Elongation at break (%) | Content (%) | MI at 205° C. (g/10 min) | Shore A hardness (A) | Elongation at break (%) |
| 1 | 100% | 8.5 | 37 | >300 | — | — | — | — |
| 2 | 100% | 15 | 30 | >300 | — | — | — | — |
| 3 | — | — | — | — | 100% | 25 | 90 | 550 |
| 4 | — | — | — | — | 100% | 25 | 80 | 750 |
| 5 | 90% | 15 | 30 | >300 | 10% | 25 | 80 | 750 |
| 6 | 10% | 15 | 30 | >300 | 90% | 25 | 80 | 750 |

The anti-slip pad with high coefficient of static friction of Examples 1 to 30 were prepared as below. As shown in FIG. 1, the polymer materials 1 to 6 in an amount shown in Table 2 were respectively fed into the first screw barrel 11 through a feeding hopper 110. The pressure and temperature of the first screw barrel 11 were respectively set at 127 bars and 190° C. to 230° C. In the first screw barrel 11, the polymer material was molten to obtain a molten polymer material, and the molten polymer material was introduced into the second screw barrel 13. The pressure and temperature of the second screw barrel 13 were respectively set at 145 bars to 165 bars and 190° C. to 230° C. The introduction part 12 was set at the front section of the second screw barrel 13, and the pressure and temperature of the introduction part 12 were respectively set at 200 bars and 190° C. to 230° C. (which is higher than the supercritical temperature of nitrogen (−147° C.)). The nitrogen supercritical fluid was added into the molten polymer material in the second screw barrel 13 through the introduction part 12 to obtain a mixture, and then the mixture was compounded to obtain a supercritical fluid blend.

The injector 14 located at the end of the second screw barrel 13 was a syringe-shaped device, and the rear end of the syringe was pressured with a pressure of 35 bars to 40 bars (which is higher than the supercritical pressure of nitrogen (34 bars)). The supercritical fluid blend was introduced into the front part of the injector 14 from the end part of the second screw barrel 13, and the supercritical fluid blend was injected into a mold 15 for injection molding, to obtain an anti-slip pad. In Table 2, the amount of blend refers to the amount of the supercritical fluid blend introduced into the mold 15 in weight (and the average density of the anti-slip pad shown in Table 3 is calculated according to the controlled amount of blend); the pressure in mold refers to the pressure of the mold 15 before injecting the supercritical fluid blend; and the injecting temperature (temp.) and speed refer to the temperature and the speed of injecting the supercritical fluid blend from the injector 14 into the mold 15. As for Comparative Examples 1 to 6, each of the polymer materials 1 to 6 was directly injected into the mold 15 without any counter pressure, and no nitrogen supercritical fluid was added, mixed or compounded, such that the resulting anti-slip pads had an unfoamed structure.

At the moment of introducing the supercritical fluid blend into the injector 14 and injecting the supercritical fluid blend into the mold 15, the pressure was reduced, and the pressure was reduced to 1 atmosphere (atm) after the pressure of the mold 15 is discharged. Nitrogen gas was rapidly released from the supercritical fluid blend to form multiple nucleation points, and then nitrogen at the nucleation points expanded to form tiny bubbles. In Examples 1 to 30 (E1 to E30) and Comparative Examples 1 to 6 (CE1 to CE6), venting holes were disposed on the upper and lower walls of the mold 15 (not shown in FIG. 1). In the injection molding of Examples 1 to 30 (E1 to E30) and Comparative Examples 1 to 6 (CE1 to CE6), the supercritical fluid blend was injected into the mold 15 at the same time of opening the venting holes of the mold 15, so the delayed venting time in mold was 0.0 sec. At last, the anti-slip pad was left in the mold 15 for cooling, to obtain the anti-slip pad with high coefficient of static friction.

TABLE 2

| | Polymer material | Amount of blend (g) | Injecting temp. (° C.) | Injecting speed (mm/s) | Pressure in mold (bar) |
|---|---|---|---|---|---|
| CE1 | 1 | 800 | 210 | 150 | N/A |
| E1 | 1 | 640 | 210 | 150 | 33 |
| E2 | 1 | 560 | 210 | 150 | 33 |
| E3 | 1 | 480 | 210 | 150 | 33 |
| E4 | 1 | 400 | 210 | 150 | 33 |
| E5 | 1 | 320 | 210 | 150 | 32 |
| CE2 | 2 | 800 | 195 | 150 | N/A |
| E6 | 2 | 640 | 195 | 150 | 33 |
| E7 | 2 | 560 | 195 | 150 | 33 |
| E8 | 2 | 480 | 195 | 150 | 33 |
| E9 | 2 | 400 | 195 | 150 | 32 |
| E10 | 2 | 320 | 195 | 150 | 32 |
| CE3 | 3 | 800 | 205 | 150 | N/A |
| E11 | 3 | 640 | 205 | 150 | 33 |
| E12 | 3 | 560 | 205 | 150 | 33 |
| E13 | 3 | 480 | 205 | 150 | 33 |
| E14 | 3 | 400 | 205 | 150 | 33 |
| E15 | 3 | 320 | 205 | 150 | 32 |
| CE4 | 4 | 800 | 190 | 150 | N/A |
| E16 | 4 | 640 | 190 | 150 | 33 |
| E17 | 4 | 560 | 190 | 150 | 33 |
| E18 | 4 | 480 | 190 | 150 | 33 |
| E19 | 4 | 400 | 190 | 150 | 32 |
| E20 | 4 | 320 | 190 | 150 | 32 |
| CE5 | 5 | 800 | 195 | 150 | N/A |
| E21 | 5 | 640 | 195 | 150 | 33 |
| E22 | 5 | 560 | 195 | 150 | 33 |
| E23 | 5 | 480 | 195 | 150 | 33 |
| E24 | 5 | 400 | 195 | 150 | 32 |
| E25 | 5 | 320 | 195 | 150 | 32 |
| CE6 | 6 | 800 | 193 | 150 | N/A |
| E26 | 6 | 640 | 193 | 150 | 32 |
| E27 | 6 | 560 | 193 | 150 | 32 |
| E28 | 6 | 480 | 193 | 150 | 33 |
| E29 | 6 | 400 | 193 | 150 | 32 |
| E30 | 6 | 320 | 193 | 150 | 32 |

Characteristics of Anti-Slip Pad with High Coefficient of Static Friction

Figure 2A:
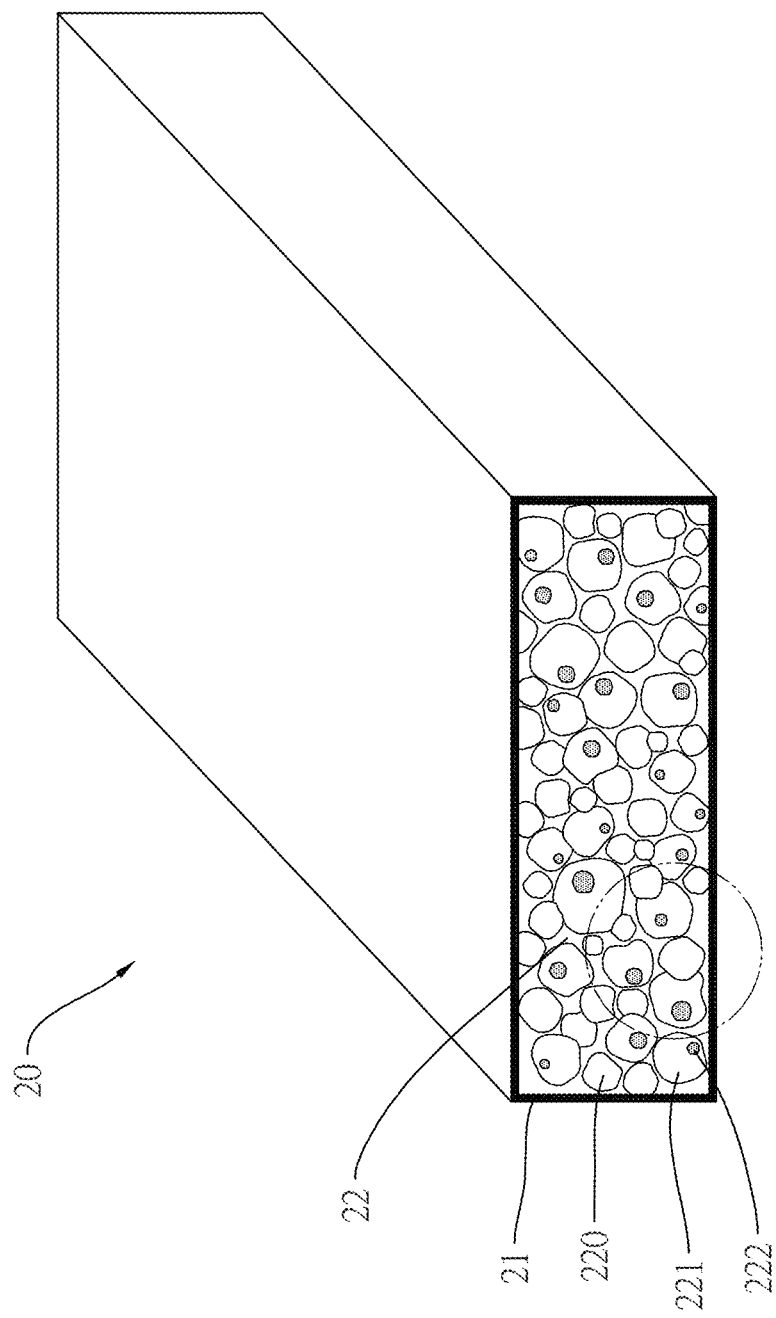
FIG. 2A is a schematic diagram of Examples of the anti-slip pad with high coefficient of static friction of the present invention.
Figure 2B:
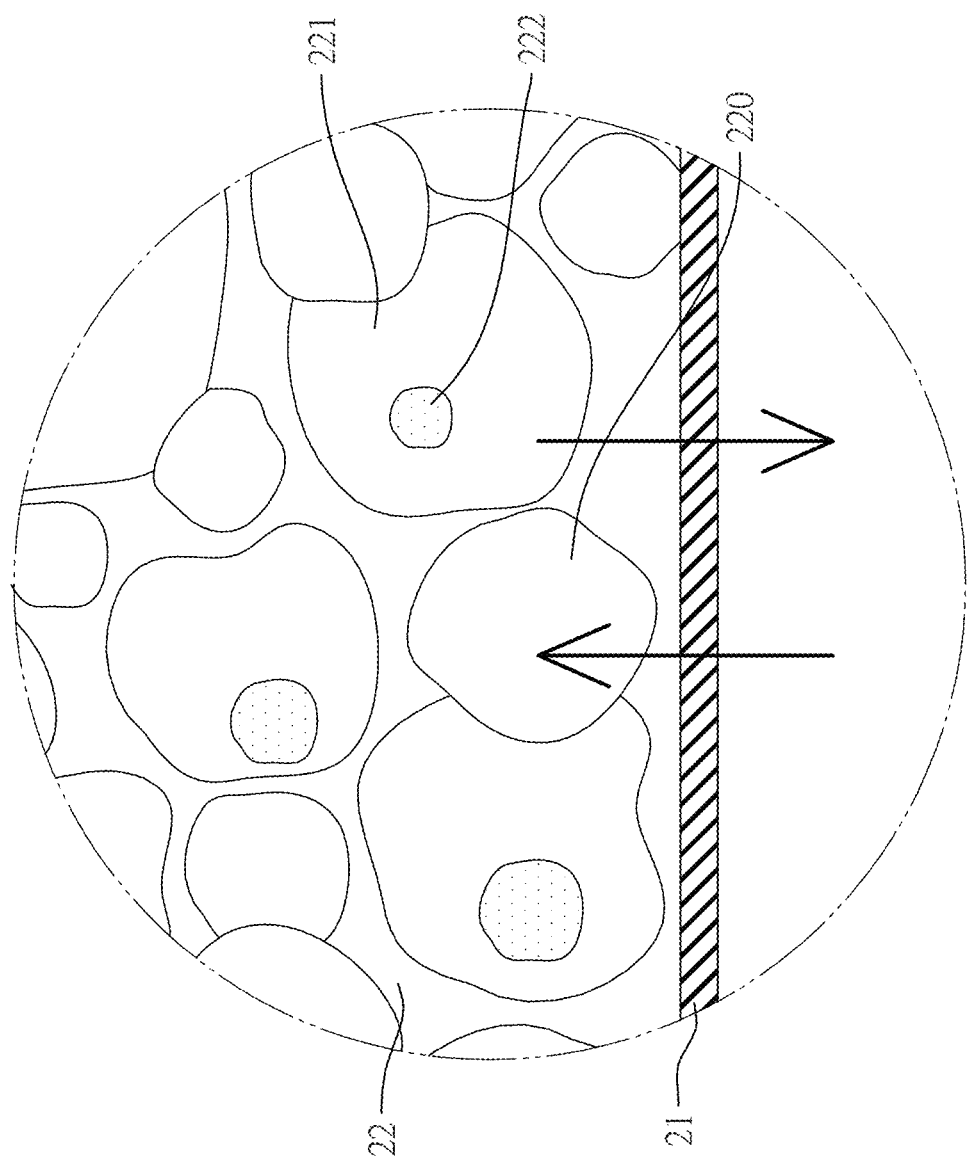
FIG. 2B is a schematic diagram of partial enlargement of Examples of the anti-slip pad with high coefficient of static friction of the present invention.
Figure 3:
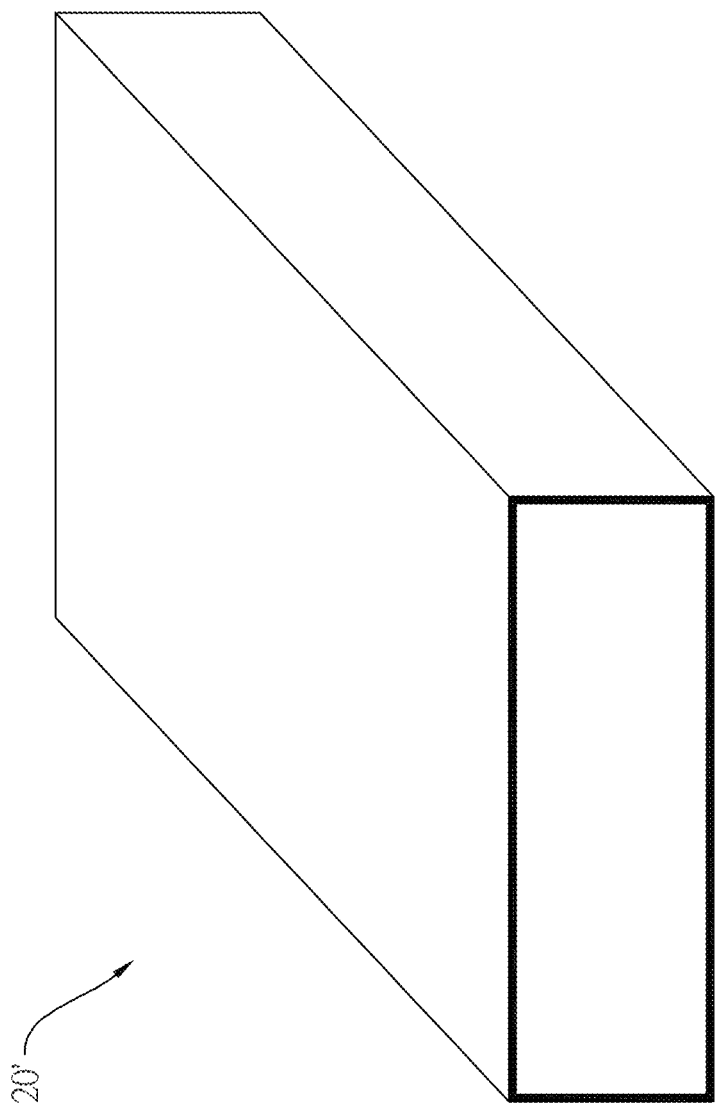
FIG. 3 is a schematic diagram of Comparative Examples of the anti-slip pad with high coefficient of static friction of the present invention.
Figure 4A:
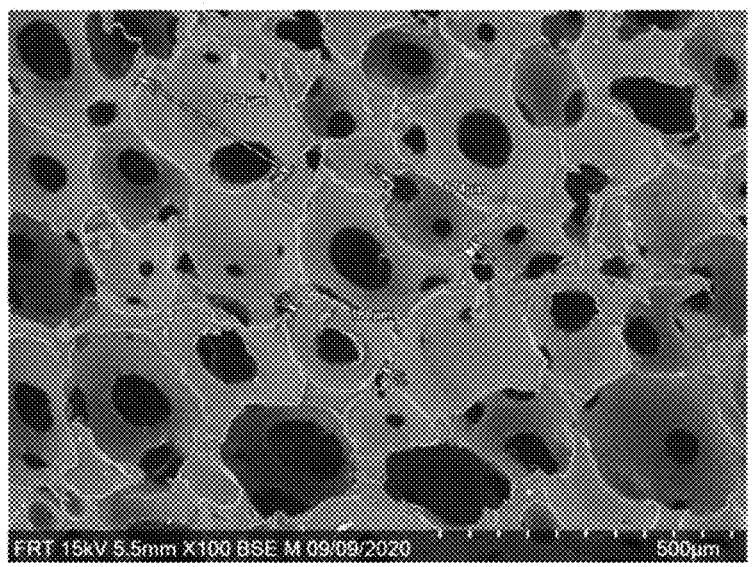
FIG. 4A is a SEM photograph of the cross section of the foamed inner layer of the anti-slip pad with high coefficient of static friction obtained in Example 4 of the present invention with a magnification of 100×.
Figure 4B:
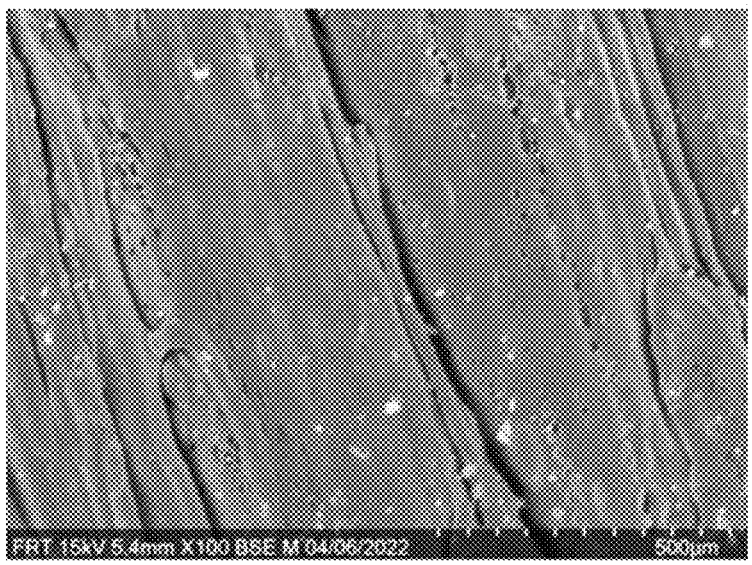
FIG. 4B is a SEM photograph of the outside surface of the surface layer of the anti-slip pad with high coefficient of static friction obtained in Example 4 of the present invention with a magnification of 100×.

FIG. 2A is a schematic diagram of Examples of the anti-slip pad 20 of the present invention, and FIG. 2B is a schematic diagram of partial enlargement of the area in the dotted box of FIG. 2A. FIG. 3 is a schematic diagram of Comparative Examples of the anti-slip pad 20' of the present invention. As shown in FIGS. 2A and 2B, the anti-slip pad with high coefficient of static friction 20 comprises a surface layer 21 and a foamed inner layer 22, and the foamed inner layer 22 is covered by the surface layer 21. The surface layer 21 and the foamed inner layer 22 are made of a material comprising a thermoplastic ether ester elastomer, a thermoplastic polyurethane or a combination thereof. The anti-slip pads 20 of Examples 1 to 30 were prepared in accordance with the above-mentioned preparation method, and the outside surface and the cross section of the anti-slip pads 20 of Examples 1 to 30 were observed by a scanning electron microscope (SEM). The SEM photograph of the cross section of the foamed inner layer 22 of the anti-slip pad with high coefficient of static friction 20 obtained in Example 4 is shown FIG. 4A, with a magnification of 100×. The SEM photograph of the outside surface of the surface layer 21 of the anti-slip pad with high coefficient of static friction 20 obtained in Example 4 is shown in FIG. 4B, with a magnification of 100×. The surface layer 21 is free of pores. The foamed inner layer 22 comprises a plurality of pores 220, 221, in which the pores 220, 221 have a long diameter of 50 μm to 400 μm. The pores 220, 221 comprise a plurality of closed pores 220 and a plurality of open pores 221, wherein any of the open pores 221 comprises at least one through hole 222 which connects the open pore 221 and another open pore 221. The open pores 221 are in a proportion of 10% to 75%. The shape of the pores is affected by the polymer material chosen and the pressure difference between the injector 14 and the mold 15. The arrow shown in FIG. 2B indicates that air may pass through the surface layer 21 of the anti-slip pad with high coefficient of static friction 20, so the air outside of the anti-slip pad with high coefficient of static friction 20 may get into the foamed inner layer 22, or go to the outside of the anti-slip pad with high coefficient of static friction 20 from the foamed inner layer 22. In the determination test of coefficient of static friction, the air may permeate into and out of the air-permeable surface layer 21, which results in a suction-like effect. Therefore, the anti-slip pads with high coefficient of static friction 20 of Examples 1 to 30 (with a structure comprising the surface layer 21 and the foamed inner layer 22) have a higher coefficient of static friction than their corresponding anti-slip pads 20' of Comparative Examples 1 to 6 (without the structure comprising the surface layer 21 and the foamed inner layer 22). Moreover, as shown in FIG. 3, the anti-slip pads 20' formed in Comparative Examples 1 to 6 have a solid structure without the surface layer 21 and the foamed inner layer 22 because no nitrogen supercritical fluid is added, mixed and compounded.

The thickness of the surface layers 21 of the anti-slip pads with high coefficient of static friction 20 obtained in Examples 1 to 30 were respectively calculated. Properties of the anti-slip pads with high coefficient of static friction 20 obtained in Examples 1 to 30 and anti-slip pads 20' obtained in Comparative Examples 1 to 6 were respectively examined. The results are listed in the following Table 3. Additionally, the surface layers 21 of the anti-slip pads with high coefficient of static friction 20 obtained in Examples 1, 5, 11, 15, 26 and 30 were cut to examine their permeability. The results are also listed in the following Table 3.

B1. Average density: examined according to the standard method ISO 1183. The average density is shown in gram per cubic centimeter (g/cm$^3$).

B2. Proportion of open pores: examined according to the standard method ASTM D6226.

B3. Coefficient of static friction at 200 g sled weight: examined according to the standard method ASTM D1894 using a standard sled weight of 200 g.

B4. Coefficient of static friction at 1000 g sled weight: examined according to the ASTM D1894, but changing the sled weight from standard sled weight of 200 g to 1000 g, but changing the weight of the sled to 1000 g.

B5. Permeability: examined according to the standard method JIS L1099A1. The permeability is shown in gram per square meter per 24 hours (g/m$^2$/24h).

The results of the above calculations and examinations are listed in Table 3.

TABLE 3

| | Polymer material | Average density of anti-slip pad (g/cm$^3$) | Thickness of surface layer (μm) | Proportion of open pores (%) | Coefficient of static friction at 200 g sled weight | Coefficient of static friction at 1000 g sled weight | Permeability (g/m$^2$/24 h) |
|---|---|---|---|---|---|---|---|
| CE1 | 1 | 1.10 | N/A | N/A | 0.47 | 0.47 | — |
| E1  | 1 | 0.80 | 600 | 23 | 0.58 | 0.62 | 250 |
| E2  | 1 | 0.72 | 500 | 31 | 0.69 | 0.95 | — |
| E3  | 1 | 0.59 | 300 | 54 | 0.80 | 1.29 | — |
| E4  | 1 | 0.50 | 150 | 66 | 0.93 | 1.64 | — |
| E5  | 1 | 0.41 | 50  | 73 | 1.10 | 2.04 | 2400 |
| CE2 | 2 | 1.07 | N/A | N/A | 0.52 | 0.52 | — |
| E6  | 2 | 0.80 | 600 | 18 | 0.63 | 0.76 | — |
| E7  | 2 | 0.70 | 500 | 25 | 0.74 | 1.30 | — |
| E8  | 2 | 0.62 | 300 | 48 | 0.85 | 1.84 | — |
| E9  | 2 | 0.49 | 150 | 60 | 0.98 | 2.40 | — |
| E10 | 2 | 0.40 | 50  | 65 | 1.15 | 2.09 | — |
| CE3 | 3 | 1.15 | N/A | N/A | 0.49 | 0.49 | — |
| E11 | 3 | 0.79 | 600 | 15 | 0.68 | 0.81 | 300 |
| E12 | 3 | 0.70 | 500 | 20 | 0.74 | 1.28 | — |
| E13 | 3 | 0.61 | 300 | 43 | 0.85 | 1.83 | — |
| E14 | 3 | 0.52 | 150 | 52 | 0.98 | 2.39 | — |
| E15 | 3 | 0.41 | 50  | 55 | 1.17 | 2.11 | 3000 |
| CE4 | 4 | 1.13 | N/A | N/A | 0.57 | 0.57 | — |
| E16 | 4 | 0.80 | 600 | 13 | 0.78 | 0.91 | — |
| E17 | 4 | 0.72 | 500 | 18 | 0.89 | 1.44 | — |
| E18 | 4 | 0.62 | 300 | 40 | 1.00 | 1.99 | — |
| E19 | 4 | 0.49 | 150 | 50 | 1.13 | 2.54 | — |
| E20 | 4 | 0.40 | 50  | 53 | 1.35 | 2.27 | — |
| CE5 | 5 | 1.08 | N/A | N/A | 0.53 | 0.53 | — |

TABLE 3-continued

| | Polymer material | Average density of anti-slip pad (g/cm³) | Thickness of surface layer (μm) | Proportion of open pores (%) | Coefficient of static friction at 200 g sled weight | Coefficient of static friction at 1000 g sled weight | Permeability (g/m²/24 h) |
|---|---|---|---|---|---|---|---|
| E21 | 5 | 0.81 | 600 | 17 | 0.64 | 0.81 | — |
| E22 | 5 | 0.69 | 500 | 23 | 0.75 | 1.33 | — |
| E23 | 5 | 0.60 | 300 | 45 | 0.86 | 1.86 | — |
| E24 | 5 | 0.51 | 150 | 57 | 0.99 | 2.41 | — |
| E25 | 5 | 0.38 | 50 | 63 | 1.16 | 2.10 | — |
| CE6 | 6 | 1.12 | N/A | N/A | 0.55 | 0.55 | — |
| E26 | 6 | 0.81 | 600 | 14 | 0.74 | 0.92 | 300 |
| E27 | 6 | 0.72 | 500 | 20 | 0.85 | 1.44 | — |
| E28 | 6 | 0.62 | 300 | 44 | 0.96 | 1.96 | — |
| E29 | 6 | 0.51 | 150 | 56 | 1.09 | 2.51 | — |
| E30 | 6 | 0.40 | 50 | 59 | 1.34 | 2.27 | 2950 |

From Table 3, it is found that the anti-slip pads of Examples 1 to 30 have good coefficient of static friction, which is determined by the standard method ASTM D1894 (using a standard sled weight of 200 g for determining the coefficient of static friction), all higher than the corresponding Comparative Example using the same material. It shows that the structure of the anti-slip pad with high coefficient of static friction of the present invention can increase the coefficient of static friction to about 1.2 times or higher, and lower average density results in better anti-slip effect. Therefore, the anti-slip pad with high coefficient of static friction of the present invention achieves the goals of light-weight and having good anti-slip effect.

Additionally, when the sled weight used in ASTM D1894 for determining coefficient of static friction is increased to 5 times higher (1000 g), the anti-slip pads with high coefficient of static friction of Examples 1 to 30 show a better coefficient of static friction (higher than 0.62). Therefore, when the anti-slip pad with high coefficient of static friction of the present invention carries a heavier load, the structure provides a greater coefficient of static friction.

From the data of permeability, it is known that no matter the polymer material used in the present invention is thermoplastic ether ester elastomer (in Examples 1 and 5, in which polymer material 1 is used), thermoplastic polyurethane (Examples 11 and 15, in which polymer material 3 is used), or a combination of thermoplastic ether ester elastomer and thermoplastic polyurethane (Examples 26 and 30, in which polymer material 6 is used), the surface layers are air-permeable. This indicates that air can pass through the surface layer of the anti-slip pad of the present invention, and give a suction-like effect on the surface of the anti-slip pad with high coefficient of static friction, thereby increasing the coefficient of static friction of the anti-slip pad.

From above, it should be clear that the thickness of the surface layer of the anti-slip pad with high coefficient of static friction is 50 μm to 600 μm, the open pores are in a proportion of 10% to 75%; and the anti-slip pad 20 has coefficient of static friction of 0.58 to 1.4. The anti-slip pad of the present invention has high coefficient of static friction, thereby resulting in excellent anti-slip effect.

The anti-slip pad of the present invention is prepared by injection molding technique with a supercritical fluid, and no chemical foaming agent is used. Therefore, no toxic substance will be produced, and no fire safety or pollution concerns will be caused. The product has high coefficient of static friction (0.58 or higher) even if the sled weight used for determining coefficient of static friction is increased to 5 times higher, thus having an excellent anti-slip effect. The anti-slip pad with high coefficient of static friction of the present invention decreases the average density to 0.35 g/cm³, which is advantageous for light weighted products. In addition, the anti-slip pad of the present invention can be prepared by using recyclable thermoplastic ether ester elastomer resin and/or thermoplastic polyurethane as the raw material, which meets the environmental requirements of waste reduction and recycling.

What is claimed is:

1. An anti-slip pad with high coefficient of static friction, which comprises a surface layer and a foamed inner layer, the foamed inner layer covered by the surface layer;
   wherein the surface layer is an air-permeable surface layer having a thickness of 50 μm to 600 μm, and the surface layer has a permeability from 250 g/m²/24 h to 3000 g/m²/24 h according to the standard method JIS L1099A1;
   wherein the foamed inner layer comprises multiple pores, the pores comprise multiple closed pores and multiple open pores, and the open pores are in a proportion of from larger than 45% to 75% according to the standard method ASTM D6226; wherein the anti-slip pad with high coefficient of static friction has an average density of 0.35 g/cm³ to 0.62 g/cm³ according to the standard method ISO 1183; the anti-slip pad with high coefficient of static friction has a coefficient of static friction of 0.58 to 1.4 at 200 g sled weight as determined according to standard method ASTM D1894; and the anti-slip pad with high coefficient of static friction is prepared by a method comprising the following steps:
   (1) providing a polymer material comprising a thermoplastic ether ester elastomer, a thermoplastic polyurethane or a combination thereof; wherein the polymer material has elongation at break of 300% or more, the thermoplastic ether ester elastomer has a melt flow index at 230° C. of 20 g/10 min or less and Shore D hardness of 30D to 45D, and the thermoplastic polyurethane has a melt flow index at 205° C. of 25 g/10 min or less and Shore A hardness of 60A to 95A;
   (2) melting the polymer material to obtain a molten polymer material;
   (3) adding a supercritical fluid into the molten polymer material to obtain a mixture, and compounding the mixture to obtain a supercritical fluid blend; and
   (4) injecting and molding the supercritical fluid blend to obtain the anti-slip pad with high coefficient of static friction.

2. The anti-slip pad with high coefficient of static friction of claim 1, wherein the polymer material comprises a combination of a thermoplastic ether ester elastomer and a thermoplastic polyurethane, and the thermoplastic ether ester elastomer is in an amount of 10% by weight or more to 90% by weight or less, and the thermoplastic polyurethane is in an amount of 10% by weight or more to 90% by weight or less, based on the total weight of the polymer material.

3. The anti-slip pad with high coefficient of static friction of claim 1, wherein the supercritical fluid is a nitrogen supercritical fluid or a carbon dioxide supercritical fluid.

4. The anti-slip pad with high coefficient of static friction of claim 1, wherein the anti-slip pad with high coefficient of static friction has a coefficient of static friction of 0.62 to 2.3 at a sled weight of 1000 g as determined according to ASTM D1894.

* * * * *